Oct. 23, 1956  V. E. ACKLES  2,767,641
DOUGHNUT COOKING MACHINE
Filed June 4, 1953  3 Sheets-Sheet 1
FIG. 1.
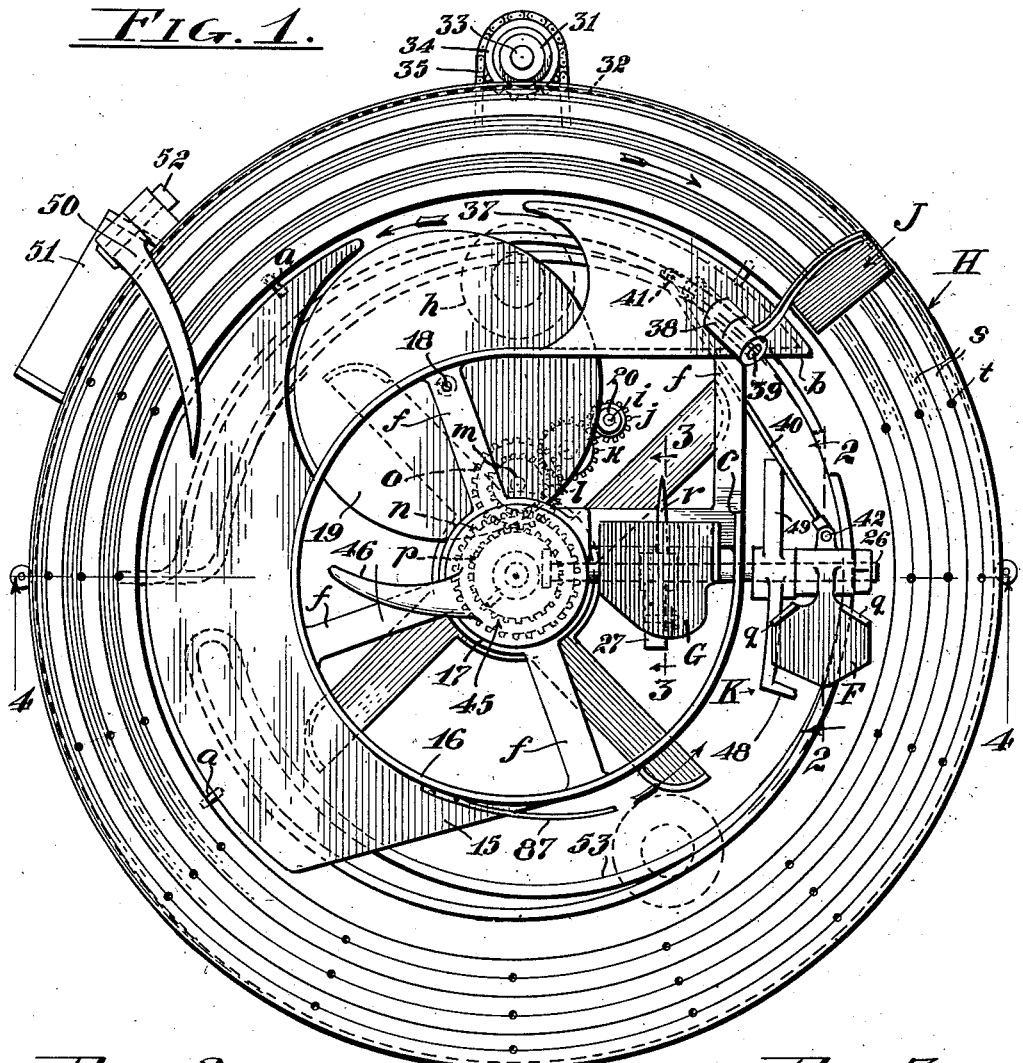
FIG. 2.
FIG. 3.
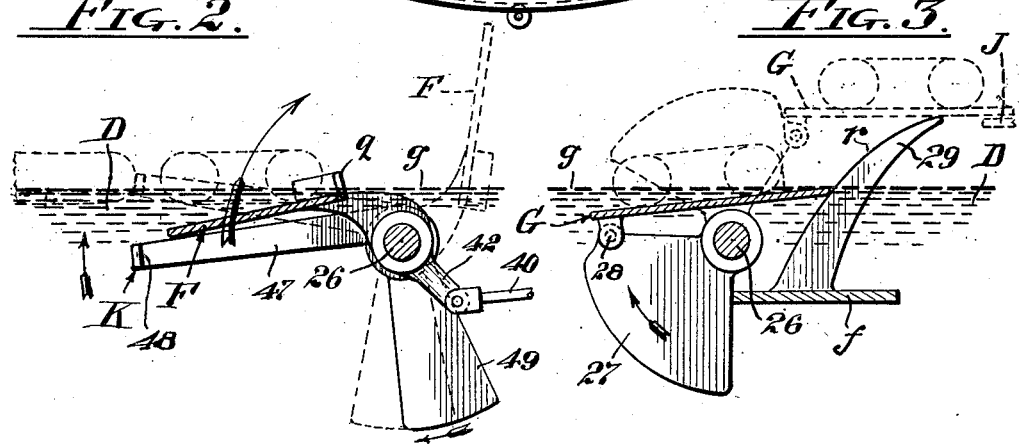

Oct. 23, 1956
V. E. ACKLES
2,767,641
DOUGHNUT COOKING MACHINE
Filed June 4, 1953
3 Sheets-Sheet 2
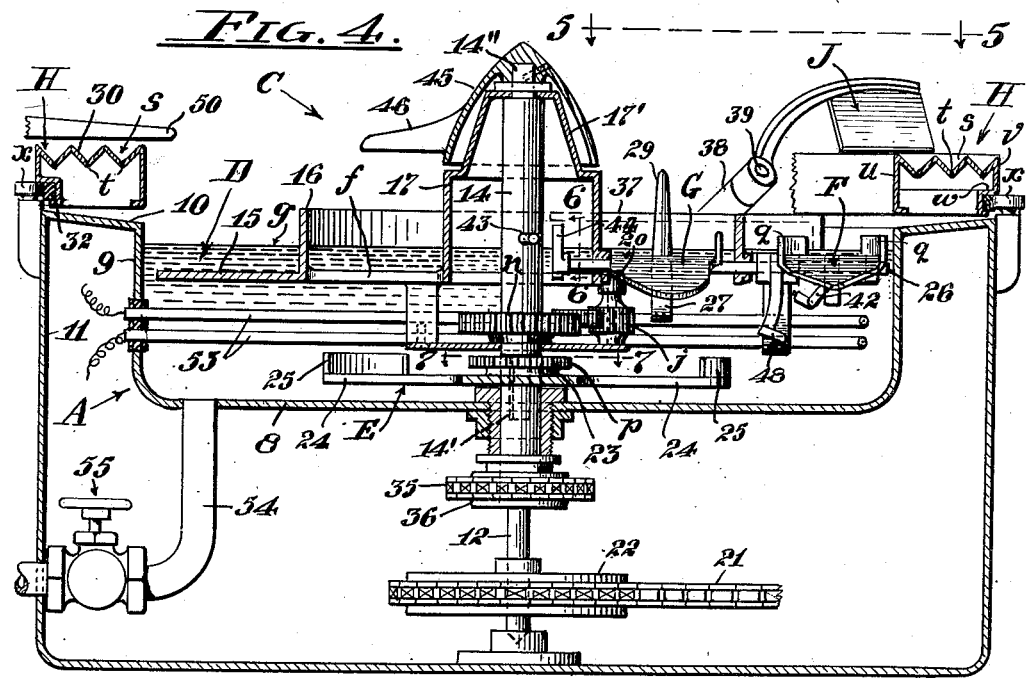
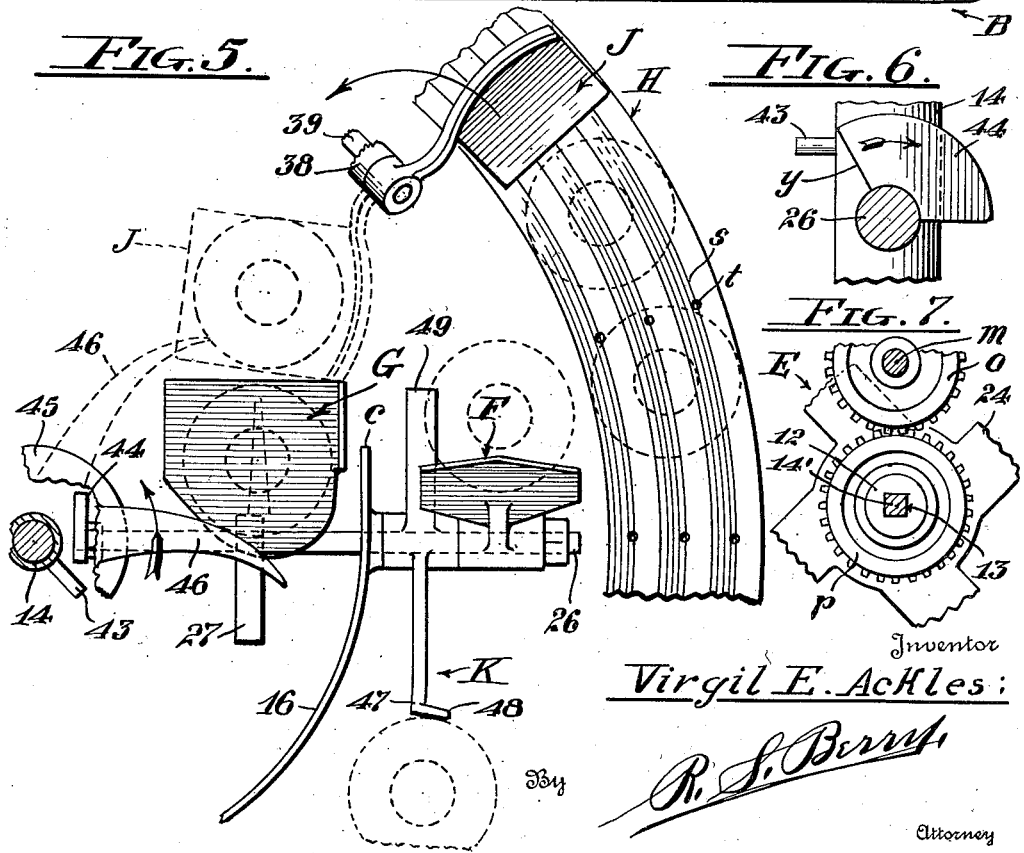
Inventor
Virgil E. Ackles;
By R. S. Berry
Attorney

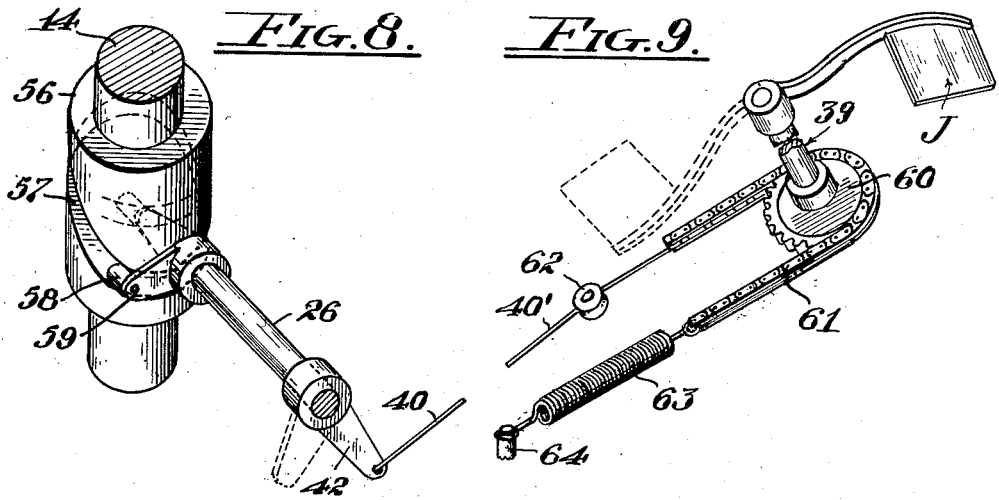
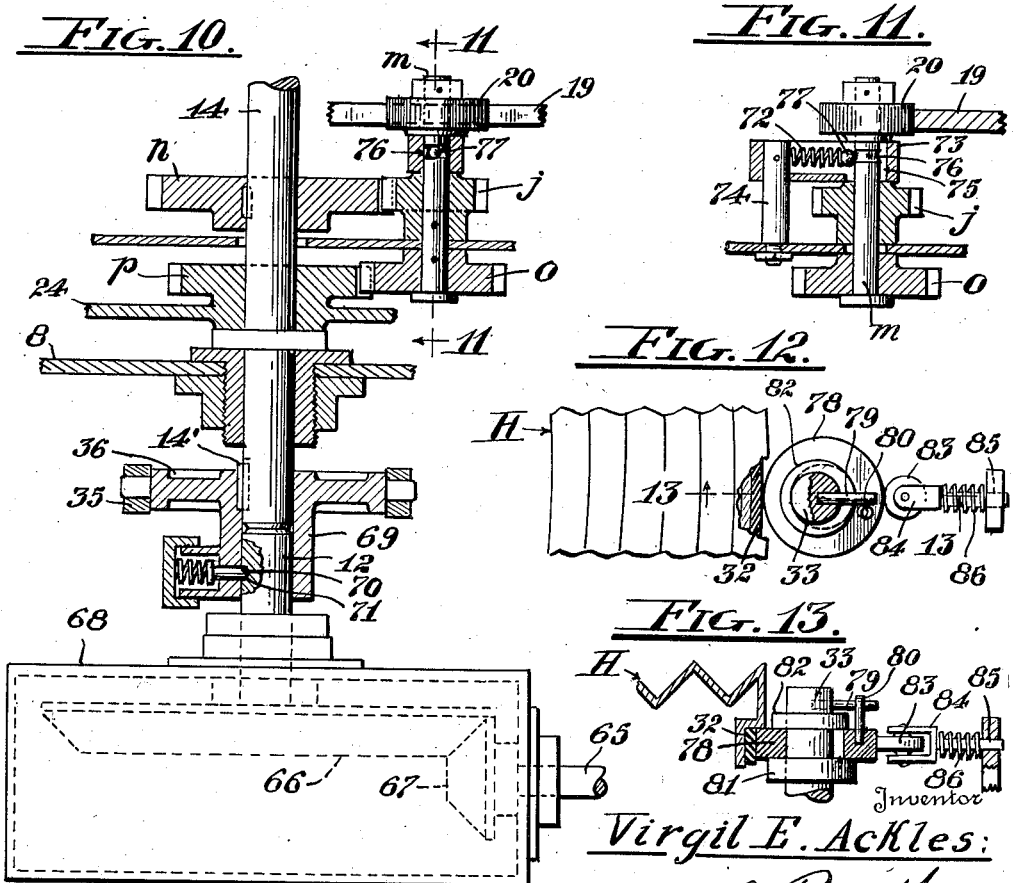

United States Patent Office
2,767,641
Patented Oct. 23, 1956

2,767,641

DOUGHNUT COOKING MACHINE

Virgil E. Ackles, Los Angeles, Calif.

Application June 4, 1953, Serial No. 359,498

18 Claims. (Cl. 99—406)

This invention relates to a machine for cooking doughnuts and particularly pertains to improvements in the type of doughnut cooking machine in which molded doughnut dough is deposited on a body of frying fat and caused to advance thereon and be initially subjected to a frying action on one side thereof and subsequently inverted and subjected to a frying action on the other side thereof; the present invention primarily residing in mechanism for advancing doughnuts in the fat, inverting the doughnuts, then after completion of the frying action thereon effecting automatic removal of the doughnuts from the fat.

The primary object of the invention is to provide a compact and highly efficient doughnut cooking mechanism embodying an effective means for circulating a body of frying fat together with means for directing doughnut rings deposited thereon in a defined path of travel, and wherein means are provided for inverting the doughnut rings in the course of their travel and embodying means for elevating the fried doughnuts free of the frying fat and transferring them to a drainage conveyor by which the product is delivered to discharge.

With the foregoing objects in view together with such other objects and advantages as may subsequently appear, the invention resides in the parts and in the combination, construction and arrangements of parts, hereinafter described and claimed, and illustrated by way of example in the accompanying drawing in which:

Fig. 1 is a plan view of the machine;

Fig. 2 is a detail in section and elevation as seen on the line 2—2 of Fig. 1 in the direction indicated by the arrows and illustrating the doughnut inverting mechanism;

Fig. 3 is a detail in section and elevation taken on the line 3—3 of Fig. 1 showing the doughnut elevating mechanism;

Fig. 4 is a section and elevation taken on the line 4—4 of Fig. 1;

Fig. 5 is a plan view taken on the line 5—5 of Fig. 4;

Fig. 6 is a view taken on the line 6—6 of Fig. 4;

Fig. 7 is a section taken on the line 7—7 of Fig. 4;

Fig. 8 is a perspective view of a modified form of the rock shaft actuating mechanism;

Fig. 9 is a perspective view of a modified form of the actuating mechanism of the doughnut transferring device;

Fig. 10 is a diagram in section and elevation showing a modified form of the driving mechanism;

Fig. 11 is a section taken on the line 11—11 of Fig. 10;

Fig. 12 is a plan view of a modified form of the annular conveyor driving mechanism; and Fig. 13 is a vertical section taken on the line 13—13 of Fig. 12.

Referring to the drawings more specifically A indicates generally a circular basin embodying a bottom wall 8 an annular side wall 9 and a marginal rim 10 supported on the side walls 11 of the cabinet B. Extending axially through the bottom wall 8 of the basin A is a vertically disposed shaft 12 terminating adjacent the bottom wall 8 and formed at its upper end with a socket 13 for the reception and driving engagement with the lower end of a shaft 14 embodied in a demountable doughnut manipulating assembly C arranged in the basin A. The assembly A includes a platform 15 detachably seating on studs $a$ projecting inwardly from the side walls 9 of the basin. The shaft 14 is removably engaged in the socket 13 in the shaft 12 by a key or spline 14'.

The platform 15 is of general arcuate form and embodies a flat plate having an outer margin extending in slightly spaced relation to the inner face of the basin side wall 9. The platform 15 is disposed in spaced parallel relation to the basin bottom wall 8 and has its inner arcuate margin disposed intermediate the axis of the basin and its side walls. An upstanding flange 16 is formed on the inner margin of the platform 15, which flange projects beyond the ends of the platform 15 concentric with the side walls of the basin and terminates in tangential end portions $b$ and $c$ extending in perpendicular relation to each other but spaced apart to form a gap therebetween. A series of webs $f$ lead inwardly from the base of the flange 16 and connect with a cylindrical housing 17 encircling the shaft 14 in spaced concentric relation thereto, the housing having a frustoconical upper end portion 17' having an upper end wall through which a reduced end 14" on the shaft 14 extends in turnable relation thereto.

The platform 15 is designed to be slightly submerged in a body of frying fat D in the basin A with the upper surface of the platform positioned slightly below the surface $g$ of the fat D and in parallel relation thereto. The upper marginal portion of the flange 16 is designed to project above the surface $g$ to form guide-ways on opposite sides thereof for doughnuts carried on the platform 15 or floated on the fat D as will presently be described.

Pivotally mounted at 18 on one of the webs $f$ and adjacent the flange 16, is a horizontally extending circular disk 19 the upper surface of which extends on a plane with the upper surface of the platform 15 contiguous the leading end of the latter which is cut away on an arc to substantially conform to the periphery of the disk 19, the disk being designed to be rotated to effect delivery on or above the platform 15 of doughnut dough rings deposited in the fat above the disk 19 as indicated by the dotted lines $h$ in Fig. 1. The disk 19 is driven through the medium of a friction pinion 20 engaged with the periphery of the disk 19, which pinion 20 is mounted on a vertical shaft $i$ fitted with a pinion $j$ meshing with an idler gear $k$ engaged with a corresponding gear $l$ on a shaft $m$. The gear $l$ meshes with a gear wheel $n$ fixed on the shaft 14 which is driven by the shaft 12 and which latter may be rotated from any suitable source of power as through a sprocket chain 21 engaging a sprocket wheel 22 on the shaft 12. Mounted on the shaft $m$ is a spur gear $o$ which meshes with a gear wheel $p$ formed on the hub 23 of a fat circulating impeller E journalled on the upper end of the shaft 12 and revoluble relative thereto. The impeller E embodies a series of blades 24 extending horizontally from the hub 23 adjacent the basin bottom wall 8; the blades being formed with longitudinally curved upstanding flanges 25 on the ends thereof serving as vanes whereby on rotation of the impeller the fat content of the basin A will be caused to flow in a circular path of travel.

Extending radially of the cylindrical housing 17 is a rock shaft 26 which leads from adjacent the shaft 14 to adjacent the side wall 9 of the basin radially of the latter adjacent the tangential end $c$ of the flange 16; the shaft 26 being revolubly supported on the flange 16 and housing 17. The shaft 26 is disposed so as to be slightly submerged in the fat D and fixed on the outer end portion thereof is a turn-over plate F which is designed to be normally disposed in at least a partially submerged position in the fat as shown in Fig. 2 with the outer end thereof presented toward the direction of flow of the fat occasioned by rotation of the impeller E; the plate F being designed to receive a doughnut floated on the fat and on actuation of the rock shaft 26 to invert the doughnut deposited thereon.

Fixedly mounted on the shaft 26 is an arcuate counter-weight 27 projecting from the side of the shaft 26 corresponding to that from which the plate F extends so that the counter-weight will normally act through the shaft 26 to dispose the plate F in its submerged position. The plate F is formed with spaced upstanding flanges $q$ on the forward edge thereof which project above the surface of the fat when the plate F is in its lowermost position to form stops or abutments for intercepting a doughnut being floated on the fat into a position above the plate F.

Pivotally supported at 28 on the upper outer portion of the counter-weight 27 is a doughnut engaging and elevating plate G which projects forwardly over the shaft 26 with its forward end slidably resting on an upwardly inclined wall $r$ on a post 29 erected on the web $f$ and against which web the counter-weight normally abuts as particularly shown in Fig. 3 to limit rotation of the shaft 26 in one direction and to normally dispose the plates F and G in their normal lowermost positions as shown in Figs. 2 and 3 in which the plates F and G are submerged in the fat. The plate G is designed on upward movement of the counter-weight 27 to advance upwardly on the inclined wall $r$ so that when the counter-weight is in its elevated position the outer end portion of the plate G will be supported upon the tip of the post 29 clear of the surface of the fat as shown in Fig. 3.

Arranged immediately above the rim 10 of the basin A concentric therewith is an annular rotary doughnut conveyor H embodying a corrugated horizontal top wall 30 providing a series of continuous annular drain channels, $s$ each of which is formed with drain outlets $t$ opening to the rim 10 which inclines downwardly to the inner face of the side wall 9 of the basin. The conveyor H also embodies inner and outer side walls $u$ and $v$ the latter of which is formed with a shoulder $w$ which seats upon a series of rollers $x$ on which the conveyor H is revolubly supported. The conveyor H is rotated by means of a friction roller 31 which engages a friction ring 32 mounted on the conveyor outer wall $v$ beneath the shoulder $w$. The roller 31 is fixed on the upper end of a revoluble vertically extending shaft 33 fitted with a spur gear 34 engaged by a sprocket chain 35 which leads to and passes around a sprocket wheel 36 on the shaft 12.

Projecting horizontally outward from the upper margin of the tangential portion $b$ of the flange 16 is a wall 37 on which is formed an inclined bearing 38 supporting a rock shaft 39 on the upper end of which is mounted for oscillatory movement a doughnut conveying plate J operable to convey doughnuts from the elevating blade G to the rotary conveyor H; the rock shaft 39 being actuated from the rock shaft 26 through the medium of a connecting rod 40 leading from an arm 41 on the lower end of the rock shaft 39 to an arm 42 formed on the hub of the turn-over plate F. Manifestly any other suitable connection may be provided between the rock shaft 38 and the rock shaft 26 whereby movement of the latter will be transmitted to the former.

The conveyor plate J travels on an arc and on an inclined path of travel and when in its lowermost position, as indicated in dotted lines in Fig. 5, is disposed contiguous the outer edge of the then elevated elevator plate G and when disposed in its uppermost position, as indicated in full lines in Fig. 5, is disposed at an inclination such as to effect delivery therefrom of the doughnut carried thereby onto the conveyor H.

As before stated the rock shaft 26 is actuated in one direction by the counter-weight 27 to assume the normal position when the elevator plate G is in its lowermost position as shown in Fig. 3. At this moment the transfer plate J is disposed in its uppermost position shown in Figs. 1, 4 and 5, that is, in overlying relation to the rotary conveyor H, with the lower edge of the plate J proximate the upper face of the conveyor H. The means here shown for actuating the rock shaft 26 to its alternate position in opposition to the counter-weight 27 comprises a pin 43 on the rotary shaft 14 and a flange 44 on the inner end of the rock shaft 26 having an end face $y$ arranged in the path of travel of the pin 42 whereby the latter on rotation of the shaft 14 will engage and thereby advance the flange 44 until the pin 42 rides out of engagement therewith thus turning the rock shaft 26 a partial revolution in opposition to the counter-weight 27 on each rotation of the shaft 14. This movement of the shaft 26 elevates the plates F and G and retracts the plate J.

Fixed on the upper end 14" of the shaft 14 is a cap 45 fitted with a horizontally extending and longitudinally curved finger 46 disposed on a plane slightly above the plane of the plate G when the latter is in its uppermost position; the finger being so disposed as to travel over the plate G while the latter is in its elevated position and then act to eject a doughnut deposited on the plate G and deliver it to the then retracted transfer plate J.

Means are provided for momenarily arresting the flow of doughnuts being delivered to the turn-over plate F and while the latter is in motion. This means is here shown as comprising a counter-balanced teeter-arm K loosely supported on the rock shaft 26 adjacent the turn-over plate F. The arm K embodies an elongated member 47 which projects substantially horizontally from the shaft 26 toward the direction of flow of the fat D and has a laterally projecting flange 48 on its outer end which is normally disposed adjacent or partly above the surface $g$ to lie in the path of a doughnut advancing on the fat, as indicated in dotted lines in Fig. 2; the member 47 being normally disposed in this elevated position by means of a counter-weight 49 affixed to the inner end thereof and depending in most part from the side of the shaft 26 opposite the member 47. The member 47 is positioned so as to extend beneath the plate F when the latter is in its lowermost position so as to then be engaged and depressed by the plate F in opposition to the weight 49 as shown in full lines in Fig. 2 whereby the member 47 will be submerged in the fat such distance as to permit the advance of a doughnut thereover into a position above the plate F; the weight 49 acting on elevation of the plate F to swing the member 47 upward and dispose the flange 48 in position to engage and hold the next to the leading doughnut during the interval in which the plate F is in motion.

Means are provided for ejecting doughnuts from the rotary conveyor H which is here shown as comprising an arm 50 extending obliquely across the upper face of the conveyor adjacent thereto and in the path of doughnuts being advanced by the conveyor so as to engage and deflect the doughnuts laterally outward off the conveyor and onto a discharge chute 51; the arm being supported on a pivot pin 52 whereby it may be swung clear of the conveyor H when need be as when removing the latter.

As a means for heating the body of frying fat D and maintaining it at requisite temperature the basin A is equipped with a suitable electrical heating coil 53. A drain pipe 54 leads from the bottom of the basin to a suitable point of discharge through a cut-off valve 55 whereby the frying fat may be drained from the basin when desired.

While the rock shaft 26 has herein before been described as actuated by means of a pin 43 on the shaft 14 by engagement with a flange 44 on the rock-shaft 26 to turn the rock-shaft in one direction as shown in Fig. 6, other means for effecting operation of the rock-shaft may be employed, such as shown for example in Fig. 8 wherein the shaft 14 is depicted as equipped with a collar 56 formed with a peripherial cam-groove 57 engaging a roller 58 on a crank-arm 59 on the outer end of the rock-shaft 26. The cam-groove 57 is contoured so that on each revolution of the shaft 14 the crank-arm 59 will be swung one complete oscillation thereby turning the rock-shaft 26 forth and back so as to effect actuation of the plates F and G, and also the transfer plate J through the arm 42 connecting rod 40, arm 42 and rock-shaft 39. However, as before stated, other means may be employed for effecting actuation of the rock-shaft 39 from the rock-shaft 26, an example of which is shown in Fig. 9 and embodies a sprocket wheel 60 fixed on the shaft 39.

A sprocket chain 61 passes around and engages the wheel 60 and has one end thereof attached to a cable 40' which leads around a direction roller 62 and connects with the arm 42 on the rock-shaft 26. The other end of the sprocket chain 60 is connected to one end of a pull spring 63 the other end of which is attached to a fixed support 64; the spring 63 exerting a pull on the chain 60 and cable 40' operating either in conjunction with the counter-weight 27 or independent of action of the latter to normally maintain the rock-shaft 26 in its normal position, and at the same time act through the wheel 60 and rock-shaft 39 to dispose the plate J in its elevated position as shown in full lines in Fig. 9. By this arrangement when the rock-shaft 26 is turned from its normal position either by the pin 43 or the cam 57, the chain 61 will be pulled by the cable 40' in opposition to the spring 63 thereby turning the wheel 60 and shaft 39 to retract the plate J to its doughnut receiving position shown in dotted lines in Fig. 9.

In the form of the driving mechanism illustrated in Fig. 10 the driven stud shaft 12 is driven from a drive shaft 65 through the medium of a pair of intermeshing transmission gears 66 and 67, mounted respectively on the shafts 12 and 65; the gears 66—67 being enclosed in a housing 68. The upper end of the shaft 12 is fitted with a sleeve 69 which projects above the shaft 12 and forms a socket into which the lower end of the shaft 14 extends; the shaft 14 and sleeve 69 being detachably interconnected by the spline 14'. The sleeve 69 is connected to the shaft 12 to rotate therewith by means of a spring pressed detent 70 carried by the sleeve 69 and normally engaging a recess 71 in the shaft 12. By this arrangement the sleeve 69 may be automatically disposed out of driving engagement with the shaft 12 in event of jamming or overloading of any of the mechanism actuated by the shaft 14; excessive load on the shaft 14 causing the detent 70 to ride out of engagement with the recess 71 so that the shaft 12 may then rotate without rotating the shaft 14.

In the arrangement shown in Fig. 10, the idler gears $k$ and $l$ and shaft $i$ are dispensed with and the pinion $j$ is fixed on the shaft $m$ and meshed directly with the gear wheel $n$ on the shaft 14, and as a means for tightly holding the friction pinion 20 in driving engagement with the perimeter of the disk 19 the shaft $m$ is loosely mounted for transverse movement toward the margin of the disk 19 under the urge of a spring 72 as shown in Fig. 11; the pinion 20 slidably seating on a bracket 73 fixed on a standard 74 thereby supporting the shaft $m$ which extends through an elongated slot 75 in the bracket and has a peripherial channel 76 in which rides a ball 77 against which the spring 72 bears and exerts a thrust to force the pinion 20 against the margin of the disk 19. The upper end of a gear $j$ slidably abuts the underside of the bracket 73 and thereby co-operates with the lower end of the pinion 20 abutting the upper side of the bracket to form a slideway and to stabilize the shaft $m$ against vertical displacement.

The mechanism for driving the annular conveyor H shown in Figs. 12 and 13 embodies an annular friction roller 78 arranged with its outer periphery abutting and frictionally engaging the friction ring 32 on the conveyor H. The roller 78 loosely encircles the driving shaft 33 for lateral movement relative thereto and is mounted thereon for driving engagement therewith by means of a pinion 79 extending radially from and engaged by the shaft 33 with its outer end projection over the roller 78 to one side of a pin 80 projecting upwardly from the roller; the pin 79 being adapted to slidably engage the pin 80 to permit slight lateral shifting of the pinion transversely of the pin 79.

Collars 81 and 82 are fixed on the shaft 33 and slidably bear against opposite sides of the roller 78 to hold it against tilting relative to the shaft 33.

A spring pressed wheel 83 bears against the outer periphery of the roller 78 and exerts an inward thrust thereon radially of the annular conveyor H whereby the roller 78 is held in operative frictional engagement with the friction ring 32 on the conveyor; the wheel 83 being carried in a yoke 84 on a guided stem 85 encompassed by a push spring 86 bearing against the yoke so as to thrust the wheel 83 against the roller 78.

In the operation of the invention a quantity of frying fat D is placed in the basin A and heated to and maintained at the requisite temperature by means of the heating coil 53, after which the shaft 14 is set in motion thereby rotating the disk 19 and the impeller E through the recited transmission mechanism and whereby the fat is caused to circulate in the basin in a clockwise direction by the action of the impeller thereon. Rings $h$ of doughnut dough are successively delivered to the fat at predetermined intervals and at a point above the outer portion of the disk 19 which is rotated clockwise so as to impel the rings onto the platform 15 where they are carried forward by the combined shoving action of the disk 19 and the flow of the fat. The raw rings of dough have little or no buoyancy and accordingly initially find support on the disk 19 and platform 15, the platform aiding in supporting the rings until they have become sufficiently expanded under the cooking action of the fat as to render them buoyant in the fat whereupon the then partly cooked dough rings will float on the fat as they leave the platform 15 and drift toward the turnover plate F which lies contiguous the side wall 9 of the basin. A deflector 87 is mounted on and projects tangentially from the outer face of the flange 16 and leads from the outer end of the plate 15 toward the plate F and serves to direct the floating and advancing doughnuts outwardly toward the side wall of the basin and insures their alignment with the plate for proper positioning thereon.

A string of dough rings are thus directed over the platform 15 and along the guide-way leading between the flange 16 and the side wall 9 of the basin, which string is maintained in motion by the flowing fat except as to intermittent arrestment thereof by the teeter-arm K, which as before stated is disposed in an elevated position in the path of the next to the leading dough ring during movement of the turn-over plate F. Upward swinging movement of the plate F is timed relative to the advancing doughnuts so that the plate F will move upward when a dough ring is positioned thereover; the plate F swinging upward and forward to a position slightly past the vertical as indicated in dotted lines in Fig. 3, so as to deposit the dough ring, which is then cooked on its underside only, in an inverted position on the surface $g$ of the body D of fat to present its uncooked side to the hot fat.

On inversion of the partly cooked dough ring the rock-shaft 26 is restored to its normal position where the weight 27 abuts the contiguous web $f$ as shown in full lines in Fig. 3.

The inverted dough rings on being delivered to the surface $g$ of the body D will be directed by the flowing fat against the tangential end portion $b$ of the flange 16 and will be deflected by the latter so as to traverse the arcuate guide-way extending along the inner side of the flange 16, during which path of travel the under or raw side of the dough ring will be cooked to produce the finished doughnut by the time it reaches the elevator plate G; the doughnut drifting over the plate G while the latter is in its lowered position, as shown in Fig. 3, wherein the rock-shaft 26 is in its retracted position.

On actuation of the rock-shaft 26 as above described in forwardly swinging the turn-over plate F, the counterweight 27 is moved upward carrying the plate G therewith to its elevated position indicated in dotted lines in Fig. 3. A doughnut previously disposed above the plate G will thus be elevated clear of the fat and positioned in readiness for transfer to the ring conveyor H. As before stated, when the rock-shaft 26 is actuated to advance the plates F and G the transfer plate J will be retracted through the medium of the connecting rod 40 or cable 40' to position the plate J in juxta-position with the elevated plate G as indicated in dotted lines in Fig. 5. When this occurs the finger 46 being advanced with and by the shaft 14 will swing horizontally over the plate G and will act to engage a doughnut imposed thereon and to shove it off the plate G onto the transfer plate J while the latter is held in its retracted position. The transfer plate J is then advanced while the plates F and G are being restored to normal, and on termination of its upward arcuate stroke where it assumes a steeply inclined position, a doughnut carried thereon from the plate G will be deposited on the rotary conveyor H and be carried by the latter until it reaches the arm 50 which acts to effect delivery of the doughnut to the discharge chute 51.

While I have shown and described a specific embodiment of my invention, I do not limit myself to the exact details of construction set forth, but the invention embraces such changes, modifications and equivalents of the parts and their formation and arrangement as come within the purview of the appended claims.

I claim:

1. In a doughnut cooking machine, the combination of a basin having a circular side wall and a bottom wall, an annular discharge conveyor revolubly supported above said basin concentric with said side wall, means for circulating a body of frying fat contained in said basin to advance doughnut rings imposed thereon, means for inverting doughnut rings carried on the fat, elevating means for lifting doughnuts above the fat after inversion thereof, means for ejecting doughnuts from the elevating means, means for receiving an ejected doughnut and transferring it to said conveyor, and means for discharging doughnuts from the conveyor.

2. In a doughnut cooking machine embodying a basin having a bottom wall and an annular side wall, means for circulating a body of frying fat in said basin to advance doughnut rings imposed thereon, means for guiding advancing doughnut rings on the fat in an arcuate row, means for successively inverting the leading doughnuts of the row thereof, means for elevating the inverted doughnuts one at a time from the fat, means for directing doughnuts from the inverting means to said elevating means, a conveyor, and means for transferring a doughnut from said elevating means to said conveyor.

3. In a doughnut cooking machine embodying a basin having a bottom wall and an annular side wall, means for circulating a body of frying fat in said basin to advance doughnut rings imposed thereon, means for guiding advancing doughnut rings on the fat in an arcuate row, means for successivley inverting the leading doughnuts of the row thereof, means for elevating the inverted doughnuts one at a time from the fat, means for directing doughnuts from the inverting means to said elevating means, a rotary annular conveyor encircling the path of travel of the doughnut rings above the fat in the basin, a swinging transfer blade mounted to oscillate between said elevating means and said conveyor and adapted to deliver doughnuts from said elevating means to said conveyor, and a rotary finger for moving a doughnut off said elevating means onto said transfer blade.

4. The structure called for in claim 3 together with a rock-shaft carrying and actuating said inverting means, means for actuating said elevating means from said rock-shaft, means for actuating said transfer blade from said rock-shaft, a rotary shaft, means for intermittently actuating said rock-shaft from said rotary shaft, means supporting said finger on said shaft, and means for actuating said fat circulating means by said shaft.

5. In a doughnut cooking machine, a basin for containing a batch of frying fat, said basin embodying a bottom wall and an annular side wall, a vertical shaft extending axially of said basin through the bottom wall thereof, impellor blades on said shaft within said basin adjacent the bottom wall thereof for circulating the fat, a rock-shaft extending radially of said vertical shaft in said basin, means for advancing said rock-shaft in one direction from said vertical shaft, a counter-weight on said rock-shaft for retracting it from its advanced position, means for directing doughnut rings in an arcuate row on the circulating fat, means on said rock-shaft for inverting the doughnuts advancing on the fat one at a time, means for elevating the inverted doughnuts from the fat actuated by movement of said rock-shaft, a rotary conveyor, and means actuated by movement of said rock-shaft for transferring doughnuts from said elevating means to said conveyor.

6. The structure called for in claim 5 in which said elevating means embodies a plate pivotally connected adjacent one end thereof to said counter-weight, and an inclined fixed wall slidably supporting the other end of said plate.

7. The structure called for in claim 5 together with a counter-balanced arm pivoted on said rock-shaft having its outer end normally disposed in the path of doughnut rings advancing on the circulating fat and arranged to be depressed by the doughnut inverting means.

8. In a doughnut cooking machine, a basin, having an annular side wall, means for circulating a body of frying fat in said basin to convey doughnut rings imposed thereon in an arcuate path of travel, means for confining advancing doughnut rings in a single row, a radially extending rock-shaft in said basin, a doughnut inverting plate fixed on said rock-shaft, a counter-weight on said rock-shaft tending to turn said rock-shaft in one direction, means limiting movement of the rock-shaft under the urge of said counter-weight and cooperating therewith to normally dispose said inverting plate in a lowered position submerged in the fat, a counter-balanced arm pivoted on said rock-shaft having an outer end presented toward the advancing doughnut rings and normally positioned to intercept the row of doughnut rings, said arm extending beneath said inverting plate and being depressed by the latter when in its lowered position out of the path of travel of the doughnut rings and being released on upward movement of said plate, and means for actuating said rock-shaft in opposition to said counter-weight to swing said plate upwardly and forwardly and thereby invert a doughnut ring imposed thereon.

9. The structure called for in claim 8 together with elevating means controlled by said rock-shaft to lift the inverted doughnut rings clear of the fat, a traveling conveyor, and means for transferring a doughnut from said elevating means to said conveyor.

10. The structure called for in claim 8 together with elevating means controlled by said rock-shaft to lift the inverted doughnut ring clear of the fat, a traveling conveyor, and means for transferring a doughnut from said elevating means to said conveyor embodying an oscillatory transfer plate and a rotary finger arranged to sweep a doughnut from said elevating means onto said transfer plate.

11. In a doughnut cooking machine, a basin for containing frying fat, said basin having a bottom wall and an annular side wall, a platform in said basin slightly submerged in the fat, a rotary disk on a plane with said platform at one end thereof for advancing doughnut rings deposited thereon onto said platform, means for circulating the fat in said basin to convey doughnut rings along said platform, means on said platform cooperating with the basin side wall forming an arcuate guide-way and directing advancing doughnut rings in a row, a radially extending rock-shaft in said basin, means supporting said rock-shaft on said platform, means on said rock-shaft for inverting dough rings advancing in said guide-way, a vertical drive shaft disposed axially of said basin having a portion extending through the bottom thereof, means beneath said basin for rotating said drive shaft, means for intermittently turning said rock-shaft in one direction from said drive shaft, counter-weight means for turning said rock-shaft in the other direction, doughnut elevating plate controlled by said rock-shaft, a conveyor, and means for transferring a doughnut from said elevating plate to said conveyor.

12. In a doughnut cooking machine, a basin for containing frying fat, said basin having a bottom wall and an annular side wall, a platform in said basin slightly submerged in the fat, a rotary disk on a plane with said platform at one end thereof for advancing doughnut rings deposited thereon onto said platform, means for circulating the fat in said basin to convey doughnut rings along said platform, means on said platform cooperating with the basin side wall forming an arcuate guide-way and directing advancing doughnut rings in a row, a radially extending rock-shaft in said basin, means supporting said rock-shaft on said platform, means on said rock-shaft for inverting dough rings advancing in said guide-way, a vertical drive shaft disposed axially of said basin having a portion extending through the bottom thereof, means beneath said basin for rotating said drive shaft, means for intermittently turning said rock-shaft in one direction from said drive shaft, counter-weight means for turning said rock-shaft in the other direction, a doughnut elevating plate controlled by said rock-shaft, a conveyor, and means for transferring a doughnut from said elevating plate to said conveyor including an oscillating transfer plate, means for actuating said plate from said rock-shaft, and a finger on said drive shaft arranged to sweep a doughnut from said elevating plate onto said transfer plate.

13. In a doughnut cooking machine, a basin for containing a body of frying fat, said basin having a bottom wall and an annular side wall, an arcuate platform removably mounted within said basin having an outer margin extending contiguous the basin side wall and an inner margin disposed intermediate said side wall and the axis of the basin, an upstanding flange on the inner margin of said platform having tangentially extending spaced apart end portions, a cylindrical housing supported on said platform concentric with said flange in inwardly spaced relation thereto, a vertical shaft extending axially of said housing having its upper end journalled therein, said shaft having a section extending through and journalled in the bottom wall of said basin, means for rotating said shaft, horizontal impeller means on said shaft for circulating fat in said basin to convey doughnut rings along and from said platform, and means attached to said platform through said flange and housing and actuated by said shaft for successively inverting doughnut rings conveyed by the fat, elevating the inverted doughnuts, and removing the elevated doughnuts.

14. The structure defined in claim 13 together with a rotary disk co-planar with said platform for directing doughnut rings onto the platform, and means for driving said disk from said shaft.

15. In a doughnut cooking machine, a basin for containing a body of frying fat, said basin having a bottom wall and an annular side wall, a vertical shaft extending axially through said bottom wall having upper and lower end portions, means connected to the lower end portion of said shaft beneath said basin for rotating the shaft, an impeller pivoted on said shaft above and adjacent said bottom wall for circulating the fat in said basin, a gear wheel on said shaft, gear connections between said gear wheel and said impeller to rotate same relative to the shaft, a rotary disk in said basin for advancing doughnut rings imposed thereon together with the circulating fat, and gear means for driving said disk from said gear wheel.

16. In a doughnut cooking machine, a circular basin, a vertical shaft extending axially of said basin, a horizontal rock-shaft in said basin, means actuated by said vertical shaft for turning said rock-shaft, doughnut inverting means on said rock-shaft, doughnut elevating means on said rock-shaft, an annular conveyor above and concentric with said basin, doughnut transfer means controlled by said rock-shaft moveable between said elevating means and said conveyor; and means on said vertical shaft for delivering a doughnut from said elevating means to said transfer means.

17. In a doughnut cooking machine, a circular basin, a vertical shaft extending axially of said basin, a horizontal rock-shaft in said basin, cam means on said vertical shaft for turning said rock-shaft, doughnut inverting means on said rock-shaft, doughnut elevating means on said rock-shaft, an annular conveyor above and concentric with said basin, doughnut transfer means controlled by said rock-shaft moveable between said elevating means and said conveyor, and means on said vertical shaft for delivering a doughnut from said elevating means to said transfer means.

18. In a doughnut cooking machine, a circular basin, a vertical shaft extending axially of said basin, a horizontal rock-shaft in said basin, means actuated by said vertical shaft for turning said rock-shaft, doughnut inverting means on said rock-shaft, doughnut elevating means on said rock-shaft, an annular conveyor above and concentric with said basin, doughnut transfer means moveable between said elevating means on said conveyor; said transfer means embodying an inclined rock-shaft, a doughnut conveying plate thereon, a sprocket wheel on said inclined shaft, a sprocket chain engaging said wheel having ends, an arm on said first named rock-shaft connected to one end of said chain, a pull spring connected to the other end of said chain; and means on said vertical shaft for delivering a doughnut from said elevating means to said doughnut conveying plate.

References Cited in the file of this patent

UNITED STATES PATENTS

| | | |
|---|---|---|
| 1,492,541 | Bergner | Apr. 29, 1924 |
| 1,559,413 | Fraser et al. | Oct. 27, 1925 |
| 1,665,017 | Bergner | Apr. 3, 1928 |
| 2,067,849 | Hunter | Jan. 12, 1937 |
| 2,083,082 | Moran | June 8, 1937 |
| 2,201,364 | Carpenter | May 21, 1940 |
| 2,243,016 | Pritchard et al. | May 20, 1941 |